B. A. CHEW.
PRESSURE HOLDING VALVE.
APPLICATION FILED JAN. 8, 1908.
909,061.
Patented Jan. 5, 1909.
2 SHEETS—SHEET 1.
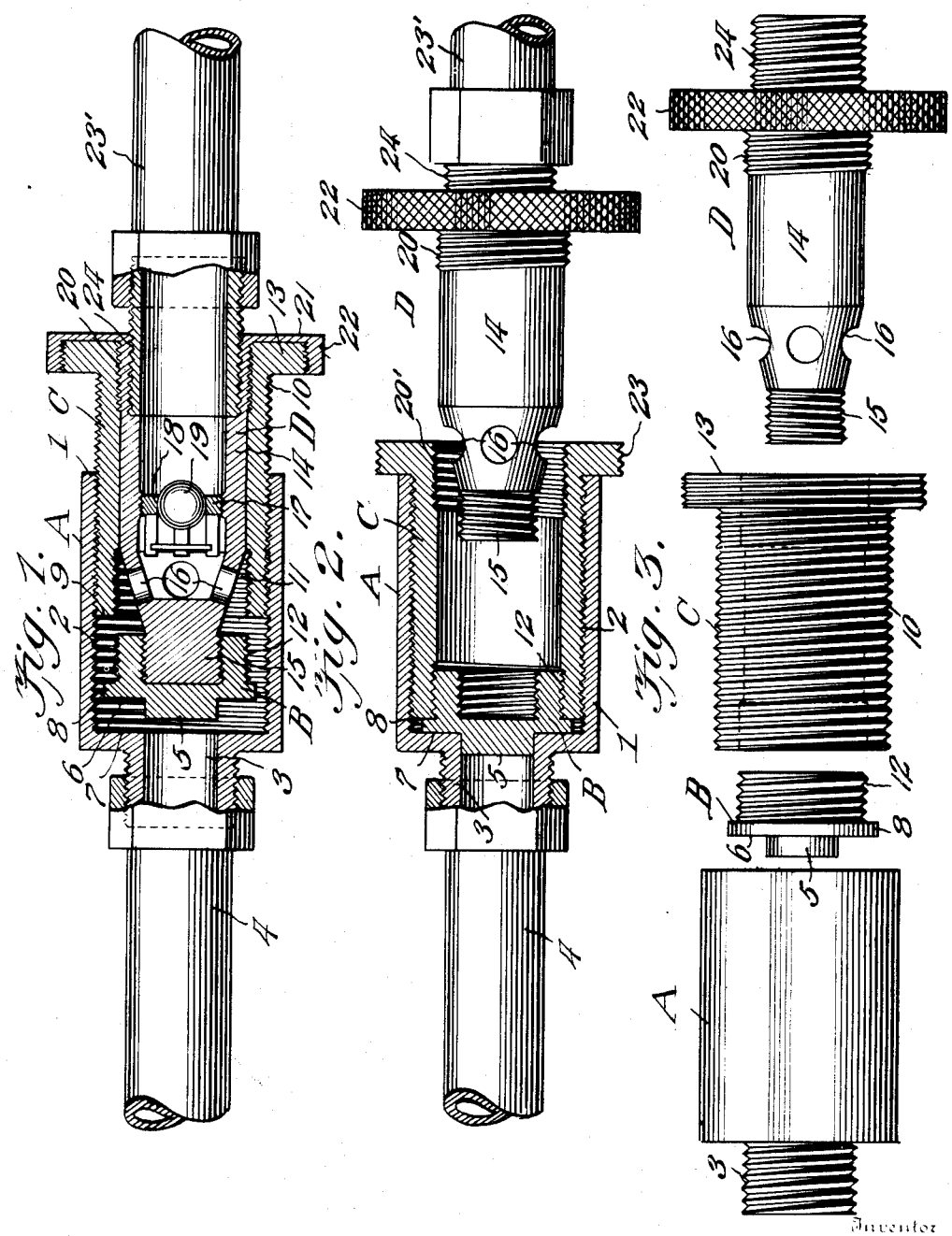
Witnesses
Frank B. Hoffmans
C. Bradway.
Inventor
Benjamin A. Chew
By Victor J. Evans
Attorney B. A. CHEW.
PRESSURE HOLDING VALVE.
APPLICATION FILED JAN. 8, 1908.
909,061.
Patented Jan. 5, 1909.
2 SHEETS—SHEET 2.
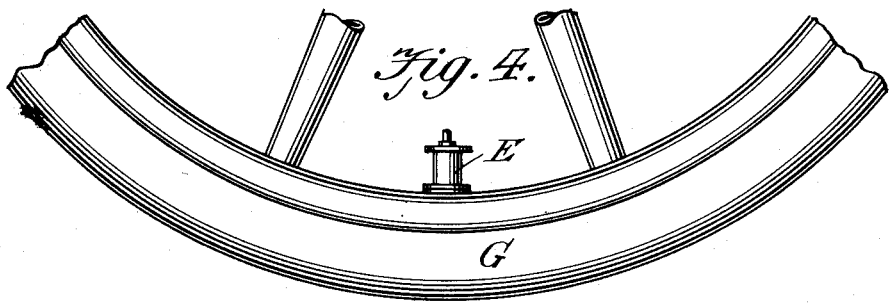
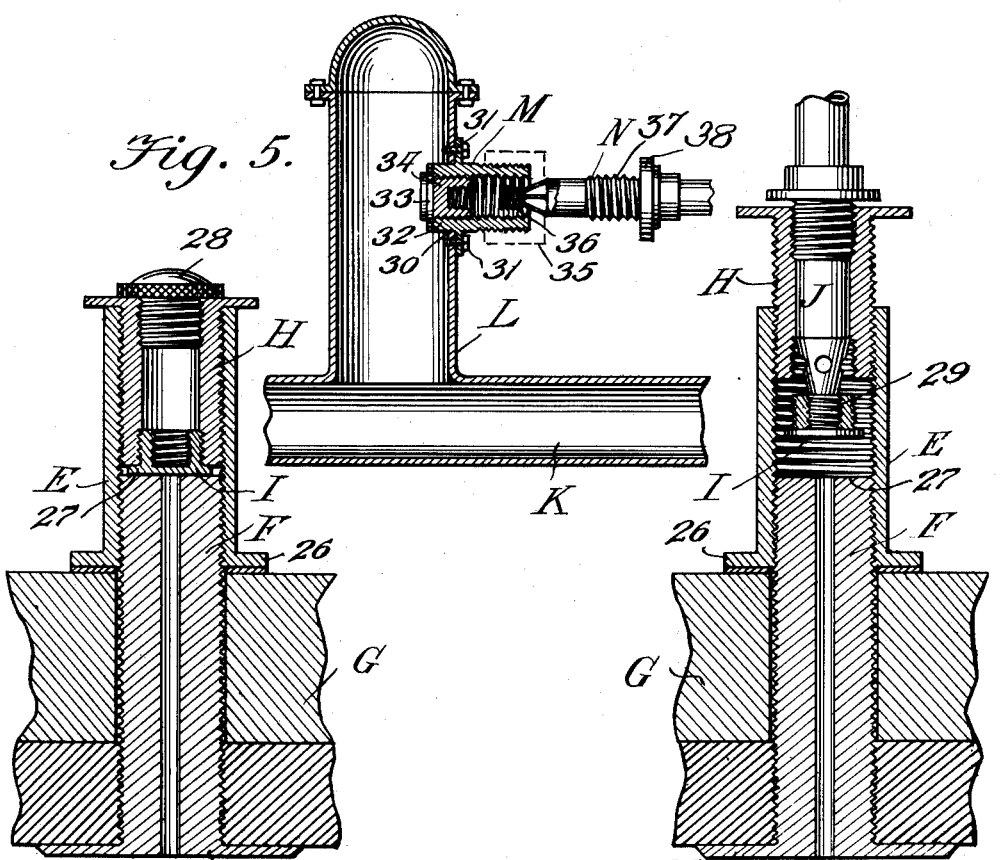

UNITED STATES PATENT OFFICE.

BENJAMIN A. CHEW, OF AUGUSTA, GEORGIA.

PRESSURE-HOLDING VALVE.

No. 909,061.  Specification of Letters Patent.  Patented Jan. 5, 1909.

Application filed January 8, 1908. Serial No. 409,890.

*To all whom it may concern:*

Be it known that I, BENJAMIN A. CHEW, a citizen of the United States, residing at Augusta, in the county of Richmond and State of Georgia, have invented new and useful Improvements in Pressure-Holding Valves, of which the following is a specification.

This invention relates to pressure-holding valves of that type intended for use in connection with apparatus adapted to contain compressible or incompressible fluids under pressure, and the invention relates more particularly to a valve of this character designed for use in connection with a charging device whereby fluid containing apparatus can be re-charged from time to time without any escape of fluid and loss of pressure through the valve to the atmosphere.

The invention has for one of its objects to improve and simplify the construction and operation of devices of this character so as to be easy and inexpensive to manufacture, thoroughly reliable and efficient in use, and readily manipulated.

A further object of the invention is the provision of a pressure-holding device including a valve which is adapted to be positively locked on its seat and which can be removed or opened by a charging means that contains a valve that operates to prevent a fall in pressure when the valve of the said device is opened.

Another object of the invention is to provide a valve mechanism which is admirably adapted for pneumatic tires for automobile wheels and the like, which is capable of being readily manipulated and to which a pump can be readily attached or detached without a loss of pressure when it is desired to pump up a tire.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a central longitudinal section through the valve mechanism showing the charging device in position and ready to supply fluid under pressure. Fig. 2 is a similar view showing the charging device in elevation and partially inserted or removed. Fig. 3 represents the various parts disassembled and in side elevation. Fig. 4 is a fragmentary view of a portion of a pneumatic tired wheel with the pressure-holding valve applied thereto. Fig. 5 is an enlarged sectional view of the valve device adapted for pneumatic tires. Fig. 6 is a similar view of such valve showing the charging device applied. Fig. 7 is a similar view of a valve of modified design, adapted for a street or fire plug.

Similar reference characters are employed to designate corresponding parts throughout the several views.

Referring to the drawings, A designates a casing of any suitable material, size and shape, but preferably in the form of a cylinder open at the end 1 and having an internal thread 2, while the opposite end has a hollow nipple 3 externally threaded for connection with a pipe or other object 4 which is adapted to hold fluid under pressure. Arranged within the casing A is a cap-shaped valve B provided with a boss 5 that is adapted to enter the nipple or neck 3, and the flat surface 6 of the valve is adapted to seat on the shoulder 7 of the casing A so as to form a perfect seal and prevent leakage past the valve. The cap has an annular flange 8 which is adapted to be engaged by the inner end 9 of a valve locking and withdrawing sleeve C which is provided with an external right-hand thread 10 engaging the thread 2 of the casing, whereby the said sleeve is adapted to positively hold the valve B against the seat. The inner end of the sleeve has an internal thread 11 which is adapted to engage the external right-hand thread 12 of the valve so that connection with the latter can be effected for seating or unseating the valve, and the outer end of the member C is provided with a circumferential flange 13 which bears on the end of the casing A so as to assist in preventing leakage of fluid from the casing.

A charging device designated generally by D is adapted to be inserted into the member C when it is desired to supply fluid under pressure to the pipe 4, and this device comprises a cylindrical body or member 14 that has its inner end formed into a nozzle, the extremity of which is provided with an exterior left-hand thread 15 that is adapted to screw into the valve B, and the nozzle portion of the member 14 has ports 16 through which fluid passes into the casing A and thence to the pipe 4 when the valve B is unseated. Arranged within the member 14 is a removable valve cage 17 provided with a seat 18 for receiving the ball valve 19 which is adapted to open inwardly under the pressure of fluid acting inwardly on the same, as in re-charging the conduit 4, and which is adapted to seat by the pressure acting outwardly from the conduit 4 when the valve B is opened. The cage 17 which controls the valve 19 is removably held in the member 14 as by means of screw threads, and it is removed or inserted through the outer end of the member 14. This member 14 has an exterior right thread 20 which is adapted to engage an interior thread adjacent the outer end of the member C, and if desired, the member 14 may be provided with an annular flange 21 which is formed with a cylindrical rim 22 that is internally threaded to receive the right-hand external threads 23 on the flange 13 of the member C. By means of this construction, the flanges 13 and 21 can tightly engage each other when the parts are in position for charging operation, so that leakage between the cylindrical member 14 and sleeve C will be avoided. The member 14 is connected with a source of fluid supply in any suitable manner, as for instance, by a pipe 23' connected with the member by the coupling sleeve 24.

Normally, the parts of the valve mechanism are in the position shown in Fig. 2 and in the outer end of the sleeve C is a plug cap or cover (not shown) of any suitable form for the purpose of preventing dirt from entering the valve, and leakage of fluid from the conduit 4 is prevented by means of the valve B being locked on its seat. When it is desired to supply fluid to the conduit 4 for increasing the pressure therein, the sleeve C is unscrewed outwardly to a suitable distance approximately from the position show in Fig. 2 to that of Fig. 1, and after the closing cap of the sleeve C is removed, the device D is inserted into the sleeve C, and upon the threaded extremity of the member 14 engaging the cap valve B, the device D is rotated anti-clockwise so as to engage the threads 15 with the internal threads of the valve. After the valve is fully screwed on the member 14, the valve can be removed from the sleeve C by a continuation of the turning of the device D, thereby moving the valve to the position shown in Fig. 1. As soon as the valve is disengaged from the sleeve C, the member 14 screws into the sleeve by the engagement of the threads 20 with the threads 20', Fig. 2, and when the member 14 is screwed home, the parts are in position to permit the charging operation to begin. It will be observed that as soon as the valve B is disengaged from the sleeve C, the pressure in the conduit 4 will operate on the ball valve 19 and cause it to firmly seat so that there will be no leakage of fluid outwardly through the device D and pipe 23'. A pump or other source of pressure can then be connected with the pipe 23' and the supply of fluid will open the ball valve 19, thereby permitting the fluid to pass through the ports 16, around the valve B, and into the conduit 4. After the desired pressure is reached, the device D is unscrewed sufficiently to disengage the threads 20 from the threads 20' and cause the cap valve to be screwed into the sleeve C, and after the valve is screwed in to the full extent, the member 14 will unscrew from the valve, thereby permitting the device D to be withdrawn without danger of leakage of fluid, since the valve B closes the inner end of the member C. The member C is next screwed into the casing A to its full extent so as to cause the valve B to firmly bear on its seat and thus effectively hold the pressure within the conduit 4.

In Figs. 4, 5 and 6, is shown a modification whereby the valve mechanism is adapted for use in connection with pneumatic tires for vehicle wheels. The casing E is provided with a cylindrical bore and is threaded throughout its length, and screwing into the casing is a stem F that passes through the wall of the tire G, there being a head 25 on the inner end of the stem which coöperates with a flange 26 on the casing E for clamping the valve mechanism in position on the tire. Threaded into the outer end of the casing E is a locking member or sleeve H that has threaded engagement with the valve I that is adapted to seat at 27 against the inner end of the hollow stem F so as to prevent the escape of air outwardly through the bore of the stem. Arranged within the outer end of the locking member H is a dust-excluding plug 28 which is adapted to be removed when it is desired to charge the tire. The charging device J is substantially the same in principle and construction as that shown in Fig. 1, and it is provided with a left-hand thread 29 at its extremity that is adapted to screw into the valve. In practice, to pump up the tire, the cap 28 is first removed and the sleeve H run outwardly to a suitable distance, thereby removing the valve from the stem F. The device J is next inserted into the member H and engaged with the valve so that the latter can be unscrewed from the member H and thereby render the device in condition for permitting air to be delivered to the tire. The ball valve in the device J prevents the air from escaping from the tire through the pump, but readily opens when the pump is set into operation so as to admit the air to the tire. After the tire is pumped up, the device J is unscrewed and at the same time the valve screwed into place in the member 8, which member is then screwed home so that the valve will be firmly seated. After this, the dirt-excluding device 28 is replaced.

Referring to Fig. 7, K represents a service pipe with which is connected an ordinary street or fire plug L of any approved form, the plug being provided with a valve casing M which is fitted in an opening 30 in the plug and secured to the latter by bolts 31. The inner end of the casing forms a valve seat 32 on which seats a valve 33. The valve has a threaded stem 34 which screws into the casing M and the outer end of the casing is normally closed by a cap 35 indicated by dotted lines. The device N for opening and closing the valve is somewhat like the charging device J hereinbefore described, except that the ball check valve within the device is dispensed with. When the cap 35 is removed, the inner threaded end 36 of the device N screws into the valve 33 and after being thus attached to the valve, the threads 37 on the device N engage the internal threads of the valve casing so that the continued turning of the device N will remove the valve and at the same time close the outer end of the casing by the flange 38 seating on the said end. A valve of this character can only be opened by means of a properly designed nipple so that the fire plug cannot be opened by unauthorized persons. Furthermore, the attaching of the hose to the fire plug automatically opens the valve.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. The combination of a tubular member interiorly threaded at both ends, a valve screwed into the inner end of the member, a nipple adapted to enter the outer end of the member, spaced threads on the nipple for connecting the latter first with the valve and then with the member to unseat the valve, and a port arranged in the nipple at a point between the inner ends of the threads.

2. The combination of a tubular member internally threaded at both ends, a valve adapted to screw into the inner end of the member, said valve being chambered and provided with an internal thread, the nipple having one end smaller than the other, a thread on the smaller end adapted to screw into the valve, a thread on the outer end adapted to screw into the outer end of the member, said threads being spaced apart for engaging the nipple with the valve before the nipple screws into the member, and a port in the nipple between the said threads.

3. The combination of a casing internally threaded and contracted at one end to form an annular seat, a valve of smaller diameter than the casing and disposed within the latter to engage the said seat, said valve having an internally and externally threaded body portion, a tubular member exteriorly threaded to screw into the casing and interiorly threaded at both ends, said valve arranged with its body screwed into the inner end of the member, and a nipple threaded at both ends for screwing into the valve and into the member to effect the seating of the valve by turning of the nipple in the member and the turning of the member in the casing.

4. The combination of a casing having an internal thread, a seat in the casing, a valve adapted to engage the seat, a sleeve screwing into the casing and having threaded engagement with the valve and adapted to lock the latter on its seat, and a charging device inserted in the sleeve and having threaded engagement with the valve for removing the latter from the sleeve, said device including means for preventing a back flow therethrough.

5. The combination of a casing, a seat therein, a valve adapted to engage the seat, a cylindrical member movable longitudinally in the casing for seating and unseating the valve, a charging device adapted to be inserted in the member, means for detachably connecting the device with the valve for disengaging the latter from the member, a removable cage in the device, and a valve in the cage.

In testimony whereof I affix my signature in presence of two witnesses.

BENJAMIN A. CHEW.

Witnesses:
WM. O. TANNER,
JULIA WEED HARRISS.